(12) United States Patent
Takahashi et al.

(10) Patent No.: US 9,131,199 B2
(45) Date of Patent: Sep. 8, 2015

(54) IMAGING APPARATUS CAPABLE OF GENERATING AN APPROPRIATE COLOR IMAGE

(71) Applicant: Clarion Co., Ltd., Saitama (JP)

(72) Inventors: Teruki Takahashi, Saitama (JP); Takahide Kojima, Saitama (JP); Kouji Obata, Saitama (JP)

(73) Assignee: Clarion Co., Ltd., Saitama (JP)

( * ) Notice: Subject to any disclaimer, the term of this patent is extended or adjusted under 35 U.S.C. 154(b) by 3 days.

(21) Appl. No.: 13/863,647

(22) Filed: Apr. 16, 2013

(65) Prior Publication Data

US 2013/0278791 A1    Oct. 24, 2013

(30) Foreign Application Priority Data

Apr. 18, 2012 (JP) ................. 2012-094379

(51) Int. Cl.
*H04N 9/73* (2006.01)
*H04N 9/04* (2006.01)

(52) U.S. Cl.
CPC ............... *H04N 9/735* (2013.01); *H04N 9/045* (2013.01)

(58) Field of Classification Search
CPC ................................. H04N 9/735; G06T 5/001
USPC ........................................ 348/223.1; 382/167
See application file for complete search history.

(56) References Cited

U.S. PATENT DOCUMENTS

| 7,164,495 B1 * | 1/2007 | Okamoto ................. 358/1.9 |
| 2006/0215908 A1 | 9/2006 | Kamon et al. |
| 2009/0033755 A1 * | 2/2009 | Friedhoff et al. .......... 348/222.1 |
| 2009/0052769 A1 * | 2/2009 | Kang et al. ................. 382/162 |

FOREIGN PATENT DOCUMENTS

| JP | 2001-086402 A | 3/2001 |
| JP | 2006-270622 A | 10/2006 |

* cited by examiner

*Primary Examiner* — Roberto Velez
*Assistant Examiner* — Cynthia Segura
(74) *Attorney, Agent, or Firm* — Studebaker & Brackett PC

(57) ABSTRACT

An imaging apparatus has an image pickup device having a plurality of pixels having input-output characteristic which non-linearly changes according to input and a plurality of color filters in a plurality of colors arranged on respective pixels; an output signal linear convertor converting a first output signal from the image pickup device into a second output signal which is predicted to be output from the image pickup device on the assumption that the image pickup device outputs the second output signal which linearly changes all over a range of the input brightness; a color signal generator generating color signals in the plurality of colors on each pixel based on the second output signal; a brightness signal generator generating a brightness signal from the first output signal; and a color brightness composition part combining the color signals and the brightness signal to generate an image signal.

4 Claims, 6 Drawing Sheets

| $R_{11}$ | $G_{12}$ | $R_{13}$ | $G_{14}$ |
| --- | --- | --- | --- |
| $G_{21}$ | $B_{22}$ | $G_{23}$ | $B_{24}$ |
| $R_{31}$ | $G_{32}$ | $R_{33}$ | $G_{34}$ |
| $G_{41}$ | $B_{42}$ | $G_{43}$ | $B_{44}$ |

IMAGING APPARATUS CAPABLE OF GENERATING AN APPROPRIATE COLOR IMAGE

CROSS REFERENCE TO RELATED APPLICATION

The present application claims priority to Japanese Patent Application No. 2012-094379 filed Apr. 18, 2012 to the Japan Patent Office, the entire content of which is incorporated herein by reference in its entirety.

BACKGROUND OF THE INVENTION

1. Field of the Invention

The present invention relates to an imaging apparatus, more particularly, to an imaging apparatus capable of generating an appropriate color image even when a subject is imaged under a high contrast (dynamic range) condition.

2. Description of the Related Art

Recently, an interest in traffic safety and prevention of traffic accidents has been increasing, and as a technology in a drive assist system of a vehicle, research and development of on-vehicle monitoring imaging apparatuses have been carried out. Among those, there has been a problem on how to ensure monitoring performance of an imaging apparatus under a very high contrast condition due to, for example, back light in the evening and thus, under a condition of possible low visibility. More specifically, there has been a problem on how to ensure color reproducibility in the imaging apparatus in consistency with human's color vision characteristic in order to distinguish color of traffic lights and lines indicating lanes even under the condition of possible low visibility. Very high contrast of such a scene is over limitation of a dynamic range of a regular image pickup device. This causes overexposure and loss of gradation information and therefore halation where an image is in solid white occurs. This also causes, to the contrary, underexposure and loss of gradation information and therefore blacking-out where an image is in solid black occurs.

Thus, an image pickup device has been proposed, which is capable of expanding the dynamic range by introducing non-linear characteristic into a relationship between input brightness and output signals.

In such an image pickup device having non-linear characteristic, a method has been proposed, where output signals of an area having non-linear characteristic are converted into linear signals (linearization); then various color signal processings are performed; and afterwards a width in bits is narrowed according to a monitor to which an image is output (see, for example, Japanese patent application publication No. 2001-86402).

Furthermore, an image pickup device has been proposed, where, without linearizing output signals of the image pickup device, specific white balance correction with LUT (Look Up Table) is performed such that photoelectric conversion characteristics in R, G, and B which are different from each other are matched with any of photoelectric conversion characteristics in R, G, and B to improve efficiency (simplifying, speeding-up) in following gradation conversion processing or color signal processing (see, for example, Japanese patent application publication No. 2006-270622).

However, an image processing apparatus disclosed in Japanese patent application publication No. 2001-86402, signals are compressed by narrowing a width in bits during signal processing steps. This means that information on low brightness parts is reduced and therefore color images taking full advantage of the original dynamic range of the image pickup device cannot be obtained. Accordingly, for example, in a scene where a subject having low brightness and a subject having high brightness are concurrently present, if output signals obtained from an image area of the low brightness subject are included in lower bits to be reduced, color of the low brightness subject cannot be reproduced in a final output image. That is, there is a problem in that an appropriate color image cannot be generated if the subject is imaged under a condition of high contrast (dynamic range) situation.

Furthermore, in an imaging apparatus disclosed in Japanese patent application publication No. 2006-270622, after performing gradation conversion, color signal processing which is the same as one performed on signals having linear characteristic. However, if the color signal processing (linear interpolating processing, linear matrix processing, and the like), which is the same as one performed on signals having linear characteristic, is applied to signals having non-linear characteristic, color deviation may occur and therefore there is a problem in that precise color reproducibility cannot be achieved.

SUMMARY OF THE INVENTION

An embodiment of the present invention is to provide an imaging apparatus capable of generating an appropriate color image even in a case where a subject is imaged under a large contrast condition.

According to an imaging apparatus of an embodiment of the present invention, by taking full advantage of the original dynamic range of an image pickup device, an appropriate color image which has no halation and blacking out, and has high color reproducibility can be generated even when a subject is imaged under a high contrast (dynamic range) condition.

That is, an imaging apparatus according to an embodiment of the present invention has an image pickup device configured to output a first output signal, the image pickup device having a plurality of pixels having input-output characteristic which non-linearly changes according to input brightness of incident light and a plurality of color filters in a plurality of colors, the plurality of color filters being arranged in a predetermined pattern on respective pixels; an output signal linear convertor configured to convert the first output signal into a second output signal which is predicted to be output from the image pickup device on the assumption that the image pickup device outputs the second output signal which linearly changes all over a range of the input brightness of the incident light; a color signal generator configured to generate color signals in lacked colors of the plurality of colors on each of the pixels based on the second output signal to generate color signals in the plurality of colors on each of the pixels; a brightness signal generator configured to generate a brightness signal from the first output signal; and a color brightness composition part configured to combine the color signals generated by the color signal generator and the brightness signal generated by the brightness signal generator to generate an image signal.

MODE FOR CARRYING OUT THE INVENTION

Hereinafter, embodiments of an imaging apparatus according to the present invention will be explained with reference to drawings.

Embodiment 1

In Embodiment 1, an imaging apparatus according to an example of the present invention is applied to a periphery monitoring apparatus performing monitoring of vehicle periphery and displaying an imaged image to passengers of a vehicle.

Figure 1:
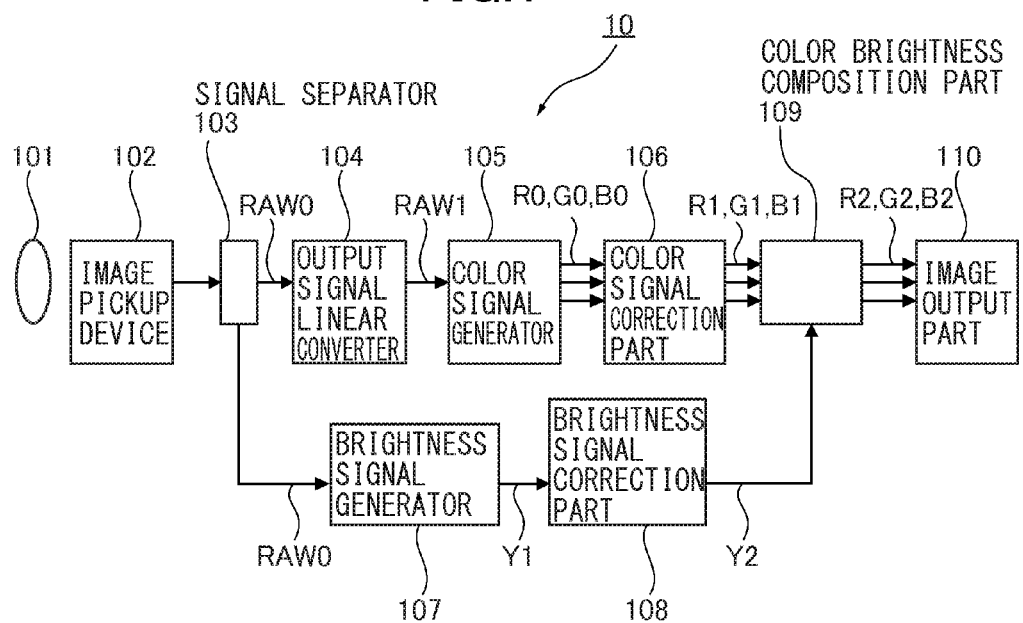
FIG. 1 is a block diagram showing a schematic configuration of an imaging apparatus according to Embodiment 1 of the present invention.

The imaging apparatus 10 according to Embodiment 1 is provided in a not-illustrated vehicle and, as shown in FIG. 1, includes a lens system 101 observing a subject, an image pickup device 102, a signal separator 103, an output signal linear converter 104, a color signal generator 105, a color signal correction part 106, a brightness signal generator 107, a brightness signal correction part 108, a color brightness composition part 109, and an image output part 110.

The lens system 101 is an optical system leading light output from the subject or light reflected from the subject onto the later-described image pickup device 102.

An image of the subject observed through the lens system 101 is imaged on the image pickup device 102, and photoelectric conversion of the light of the imaged image into output voltage signal e according to input brightness is performed. The above-obtained output voltage signal e is digitized through a not-illustrated built-in amplifier and a not-illustrated built-in AD converter to generate an output signal RAW0.

The signal separator 103 separates the output signal RAW0 generated in the image pickup device 102 into two identical output signals RAW0, RAW0.

The output signal linear converter 104 converts one of the two output signals RAW0 separated in the signal separator 103 into a linearized output signal RAW1 having linear characteristic by gradation conversion (linearization) processing. Details of the conversion processing performed in this process will be explained in the later-described description regarding operations.

The color signal generator 105 separates the linearized output signal RAW1 obtained by the output signal linear converter 104 into three signals respectively corresponding to colors of R, G, and B, performs linear interpolation on a blank pixel generated due to the separation by using values of pixels around the blank pixel to generate linear color signals (color signals) $R_0$, $G_0$, and $B_0$.

The color signal correction part 106 corrects the linear color signals $R_0$, $G_0$, and $B_0$ generated by the color signal generator 105 as necessary to generate corrected linear color signals $R_1$, $G_1$, and $B_1$. Details of the correction performed in this process will be explained in the later-described description regarding operations.

The brightness signal generator 107 generates brightness signal $Y_1$ from the other output signal RAW0 of the signals separated by the signal separator 103. Details of the processings performed in this process will be explained in the later-described description regarding operations.

The brightness signal correction part 108 corrects the brightness signal $Y_1$ generated by the brightness signal generator 107 as necessary to generate corrected brightness signal $Y_2$. Details of the processings performed in this process will be explained in the later-described description regarding operations.

The color brightness composition part 109 combines the corrected linear color signals $R_1$, $G_1$, and $B_1$ and the corrected brightness signal $Y_2$ to generate image signals $R_2$, $G_2$, and $B_2$. Details of the processings performed in this process will be explained in the later-described description regarding operations.

The image output part 110 is, for example, a display monitor to output the image signals $R_2$, $G_2$, and $B_2$ generated by the color brightness composition part 109.

As the lens system 101, a deep-focus lens is generally used in a case of an on-vehicle monitoring imaging apparatus. However, a lens system having a zoom lens or auto-focus mechanism may be used, or a lens system having an aperture stop or a shutter may be also used. In order to improve image quality and color reproducibility, a lens system having various filters such as an optical low-pass filter, infrared cut filter, and the like may be also used.

As the image pickup device 102, photoelectric conversion device such as a CMOS image sensor, a CCD image sensor, or the like may be used, which outputs a signal digitalized into 8 bits (0-255) as the output signal RAW0 and has a dynamic range of about 100 dB at maximum, of input brightness.

Figure 4A:
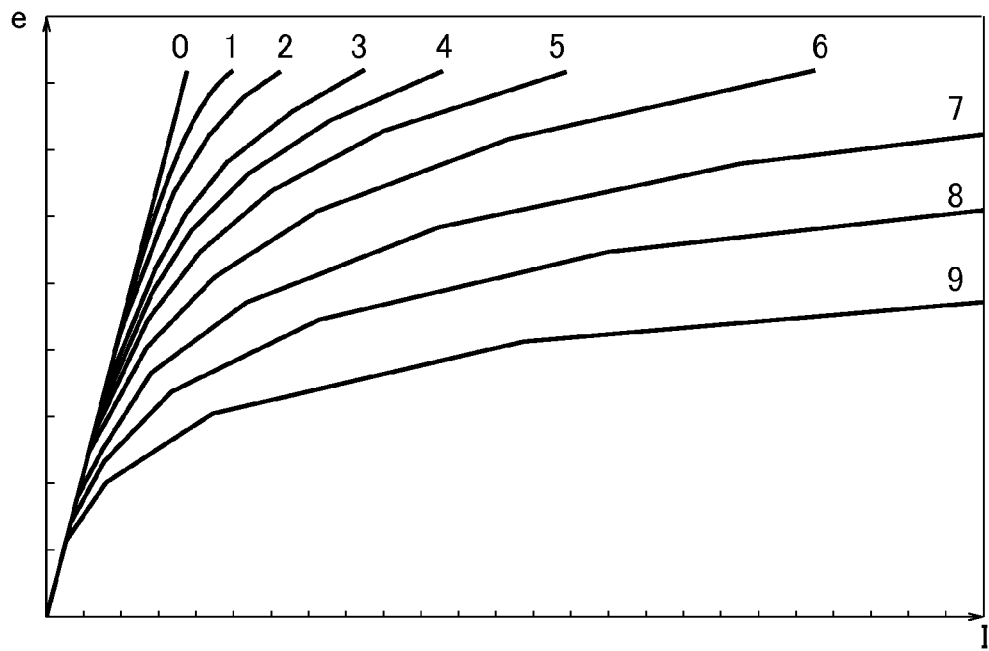
FIG. 4A is a view showing an example of input-output characteristic of an image pickup device used in Embodiment 1 of the present invention.

As the photoelectric conversion characteristic (hereinafter, input-output characteristic) of the image pickup device 102, a plurality of input-output characteristics are provided as shown in FIG. 4A, and the input-output characteristic can be changed by changing a reset timing or a reset electric voltage of an electric charge stored in each pixel of the image pickup device 102 receiving incident light.

The input-output characteristic shown in FIG. 4A has a non-linear input-output characteristic where an output voltage signal e nonlinearly changes in relation to input brightness I. This is known as a typical input-output characteristic of a logarithmic conversion type photoelectric conversion device.

Figure 4B:
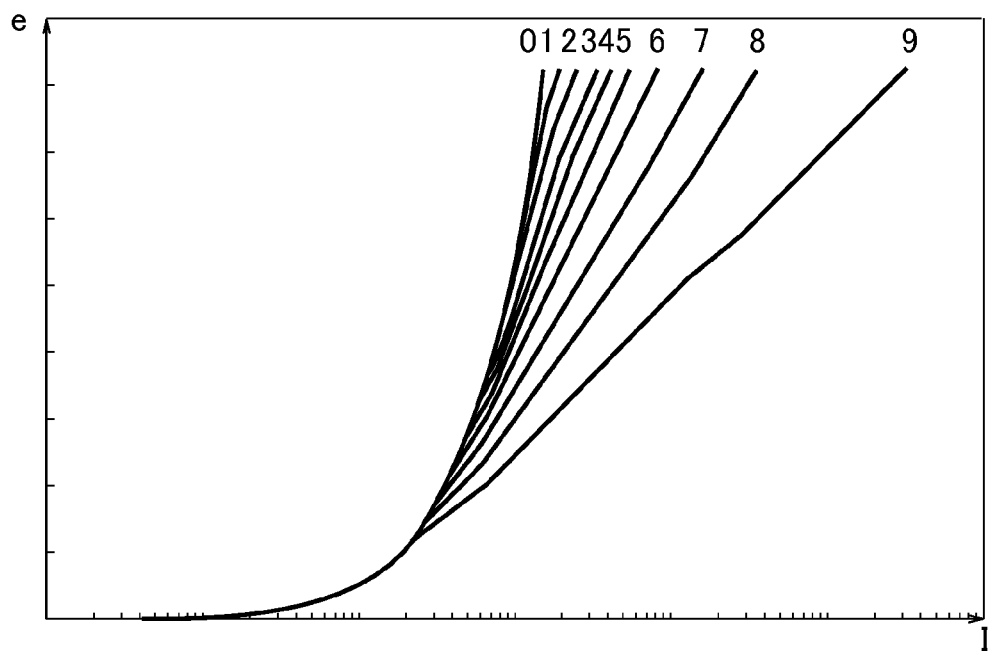
FIG. 4B is a view showing the example of FIG. 4A with the horizontal axis in a logarithmic scale.

FIG. 4B is a graph where the horizontal axis of the graph shown in FIG. 4A is converted into a logarithmic scale and shows that a dynamic range of the input brightness I, where signals without halation or blacking-out can be output, changes according to difference in the input-output characteristics.

More specifically, in FIG. 4B, as the number provided on the input-output characteristic increases, the dynamic range of the input brightness I increases.

The input-output characteristic is determined from, for example, the plurality of input-output characteristics (0 to 9) shown in FIG. 4A by a not-illustrated exposure controller built in the image pickup device 102 according to a scene to be imaged. For example, based on brightness of the imaged scene, the input-output characteristic is selected to perform imaging, by which an image to be imaged has highest contrast as it can without occurrence of halation and blacking-out.

Specifically, in the above-mentioned exposure controller, the number of pixels of possible halation and blacking-out is obtained based on output statistical information of one image in each frame and detection of halation or blacking-out is performed by threshold determination. When halation is detected, the characteristic of the larger number (higher dynamic range) than the current number is selected. When halation is not detected, the characteristic of the lower number (high contrast) than the current number is selected. When blacking-out is detected, exposure time is set to be larger than the current exposure time, and when blacking-out is not detected, the exposure time is set to be shorter than the current exposure time. The exposure time affects a slope of the input-output characteristic shown in FIG. 4A, and affects a lateral position of the input-output characteristic shown in FIG. 4B. In FIGS. 4A and 4B, changes according to the exposure time are not shown and the exposure time is set to a certain time.

The image pickup device 102 has pixels generating output voltage signal e shown in FIG. 4A or 4B in a two-dimensional manner. On the pixels, color filters each transmitting selectively light in one of R, G, and B (red, green and blue) components are arranged in a regular manner.

Figures 5, 6:
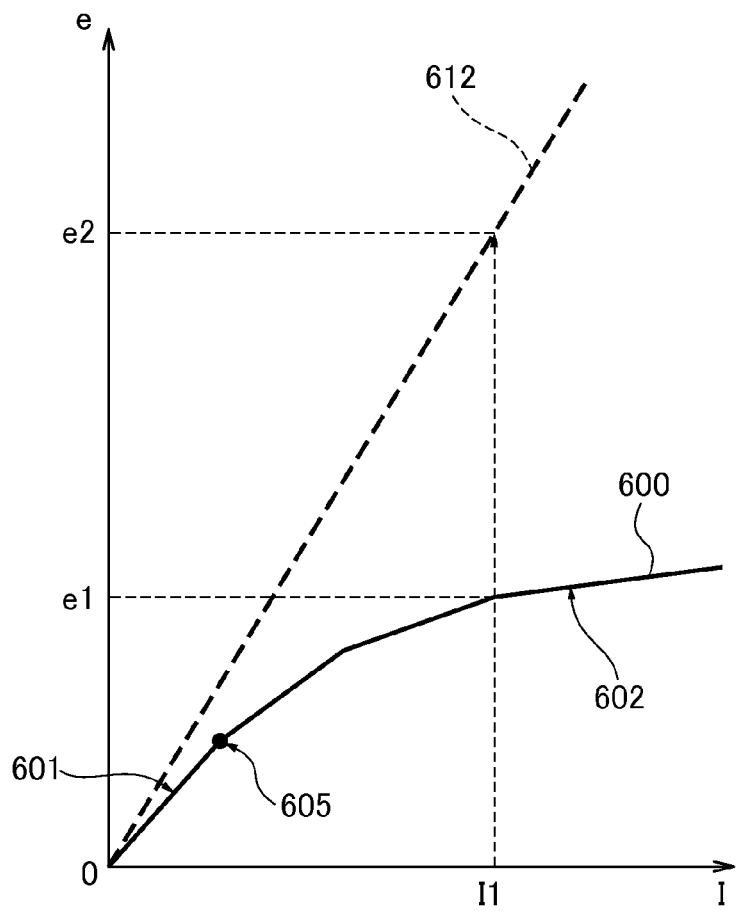
FIG. 5 is a view explaining an example of an array of color filters of the image pickup device used in Embodiment 1 of the present invention.
FIG. 6 is a view explaining conversion processing performed in an output signal linear converter in Embodiment 1 of the present invention.

In FIG. 5, R indicates a color filter transmitting red light, G indicates a color filter transmitting green light, and B indicates a color filter transmitting blue light. The color filter array shown in FIG. 5 is called a Bayer array and is generally used in a single-plate type color camera imaging a color image with a single image pickup device.

In FIG. 5, two digit numbers ij (i=1-4, j=1-4) attached to R, G, and B indicate information specifying a position of the pixel on the color filter of FIG. 5. For example, a pixel indicated by $B_{22}$ outputs signal $B_{22}$ via a color filter transmitting blue light.

Next, operations of the imaging apparatus according to this embodiment will be explained.

Figure 2:
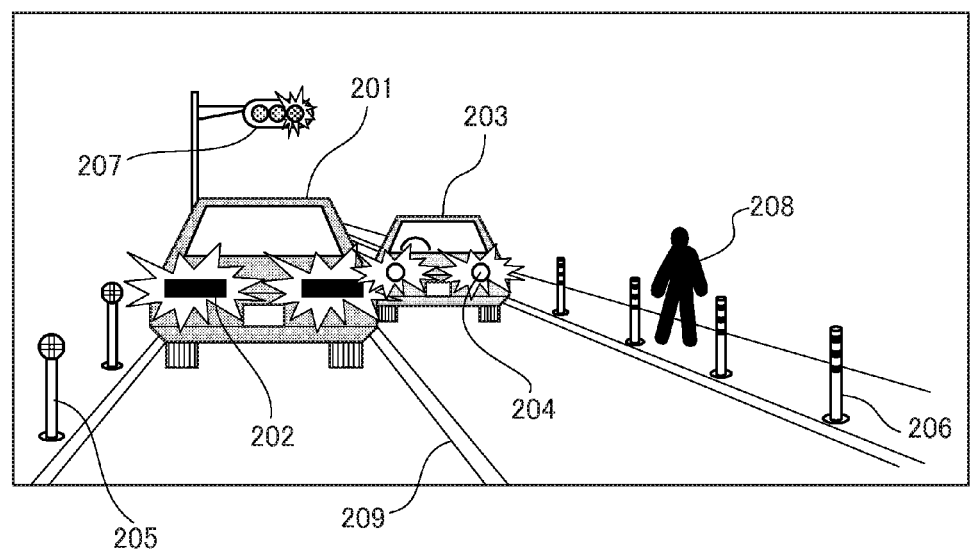
FIG. 2 is a view showing an example of a scene where an embodiment of the present invention is applied.

Referring to FIG. 2, a scene where the imaging apparatus 10 is applied will be explained. FIG. 2 schematically shows an image obtained when imaging a road at night by using the imaging apparatus 10. That is, a leading vehicle 201, an oncoming vehicle 203, reflection devices 205, 206 on road markers, a traffic light 207, a pedestrian 208, lane markers 209, and the like, which are subjects to be imaged on the road, are imaged and shown in an image.

Figure 3:
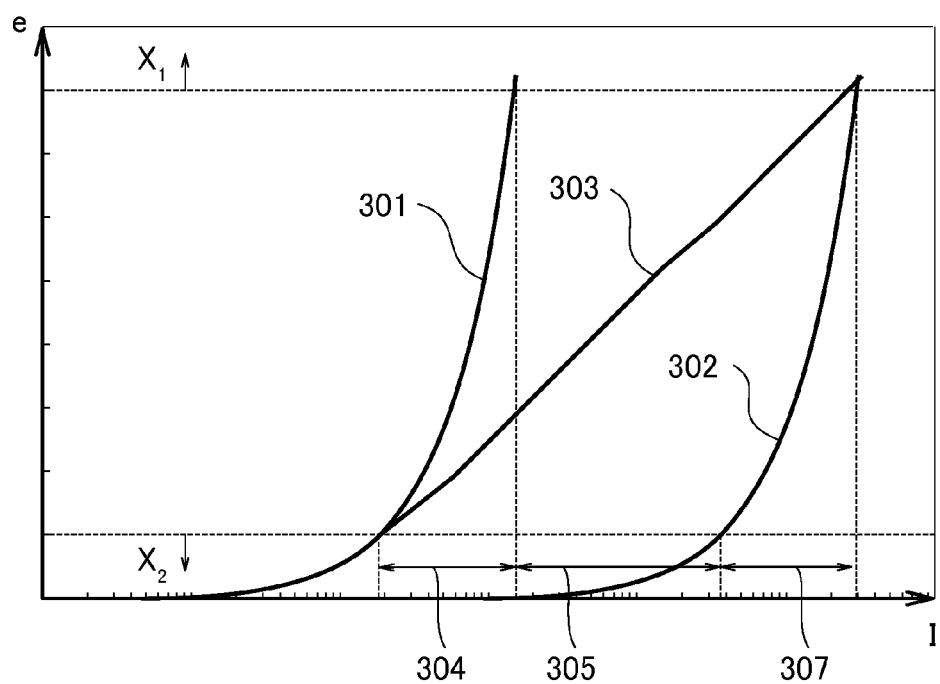
FIG. 3 is a view explaining input-output characteristic of the imaging apparatus according to an embodiment of the present invention when used in the scene shown in FIG. 2.

FIG. 3 shows a relationship between an input brightness I and an output voltage signal e in the image obtained by imaging the road shown in FIG. 2 with a general image pickup device having a linear input-output characteristic.

More specifically, FIG. 3 shows an input-output characteristic 301 at a long exposure time and an input-output characteristic 302 at a short exposure time as input-output characteristics when two different exposure times are provided, and further an input-output characteristic 303 which is supposed to be able to generate an appropriate color image without occurrence of halation or blacking-out when imaging the subjects on the road and all subjects are in the image.

Since such a night scene has very high contrast, if the image pickup device with a linear input-output characteristic is used, the contrast is beyond the limit of the dynamic range. Accordingly, there is a problem that halation or blacking-out occurs.

More specifically, in FIG. 3, an input brightness band area 304 is occupied mostly by parts which do not receive headlights of a vehicle, or the lane markers 209 or the pedestrian 208 which poorly reflects headlights of the vehicle or lights on the road; an input brightness area 305 is occupied mostly by taillights 202; and an input brightness band area 307 is occupied mostly by the headlights 204. If the exposure time is determined such that the input brightness band area 304 is optimally imaged as shown by the input-output characteristic 301, the output voltage signals e from the input brightness band area 307 and the input brightness area 305 would be saturated. Therefore so-called "halation" occurs (shown by $X_1$ in FIG. 3 as an area where halation occurs).

To the contrary, if the exposure time is determined such that the input brightness band area 307 is optimally imaged, which is occupied mostly by the headlights 204 which are the brightest, the output voltage signal e from the input brightness band area 304 or from the input brightness area 305 goes down under a line indicating blacking-out. Therefore, so-called "blacking-out" occurs (shown by $X_2$ in FIG. 3 as an area where blacking-out occurs).

If an image is generated based on the input-output characteristic 303, the subjects from the darkest lane markers 209 to the brightest headlights 204 are included within the range without halation and blacking-out in the input-output characteristic 303. The input-output characteristic of the image pickup device 102 used in this embodiment substantially coincides with the input-output characteristic 303. The input-output characteristic 303 corresponds to the input-output characteristic 9 of FIG. 4A and the input-output characteristic 9 of FIG. 4B.

Next, operations of the imaging apparatus 10 will be explained with reference to the flowchart of FIG. 7.

Based on instructions from passengers in the vehicle or the monitoring system mounted on the vehicle, a trigger signal is output to the image pickup device 102 through a not-illustrated image pickup device controller. The image pickup device 102 receives the trigger signal and performs imaging of light signals imaged on the image pickup device 102 through the lens system 101 (step S700 in FIG. 7). Before imaging, the input-output characteristic is previously selected according to the above-described method.

Figure 7:
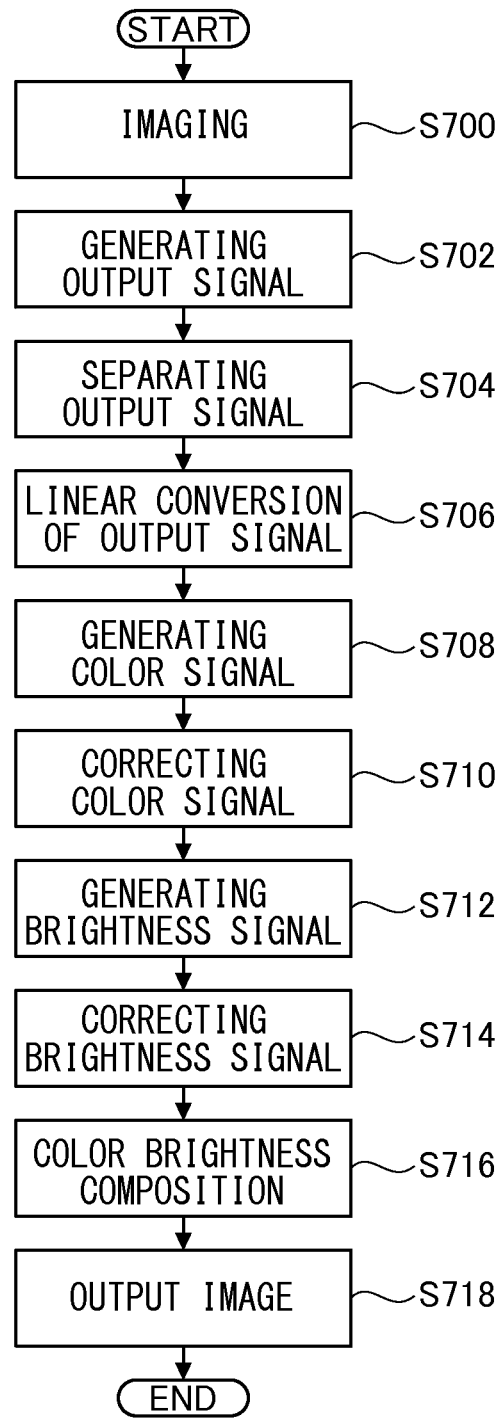
FIG. 7 is a flowchart showing a flow of processings in Embodiment 1 of the present invention.

The imaged light is converted into the output voltage signal e by the image pickup device 102 and then digitized into 8 bits (0-255) by the AC converter to generate the output signal RAW0 (step S702 in FIG. 7).

The output signal RAW0 (8 bits) from the image pickup device 102 are separated by the signal separator 103 into two output signals to generate brightness signal where the input-output characteristic of the image pickup device 102 is maintained as it is (step S704 in FIG. 7), separately from color signal processing. The two separated output signals are identical to the output signal RAW0 before the separation.

Next, in the output signal linear converter 104, as shown in FIG. 6, the linear conversion processing (linearization) is performed under the assumption that the image pickup device 102 has a predicted linear characteristic 612 where the output voltage signal e linearly changes in relation to the input brightness I, by gradation conversion (linearization) processing (step S706 in FIG. 7).

Hereinafter, the linearization processing will be explained with reference to FIG. 6.

The image pickup device 102 has, as shown in the input-output characteristic 600 of FIG. 6, a linear characteristic 601 in an area where the input brightness I is low. In this area, the output signal which linearly changes in relation to the input brightness I is output.

The image pickup device 102 has a non-linear characteristic 602 in an area where the input brightness I is high. In this area, the output signal which non-linearly changes in relation to the input brightness I is output.

The linear characteristic area 601 and the non-linear characteristic area 602 are continuous and connected at a connection point 605. The output signal output from the image pickup device 102 is referred to as a first output signal $S_1$.

It is assumed that the input-output characteristic of the image pickup device 102 is linear all over a range of the input brightness. More specifically, as shown by dot line in FIG. 6, it is assumed that the input-output characteristic shows the predicted liner characteristic 612 having linearity. An output signal predicted to be output from the image pickup device 102 based on the predicted linear characteristic 612 is referred to as a second output signal $S_2$.

In the output signal linear converter 104, processing is performed, in which the first output signal $S_1$ output from the image pickup device 102 is converted into the second signal $S_2$ which is predicted to be output from the image pickup device 102 under the assumption that the input-output characteristic shows the predicted linear characteristic 612.

That is, in a case of FIG. 6, for the input brightness $I_1$, the output voltage signal obtained by the input-output characteristic 600 is $e_1$ and the output voltage signal obtained when it is assumed that the input-output characteristic shows the predicted linear characteristic 612 is $e_2$. Then, the processing is performed, in which the output voltage signal $e_1$ is multiplied by $e_2/e_1$.

As a method for linearization, various methods may be used. In this embodiment, a method by conversion using LUT is used. More specifically, the input-output characteristic of the image pickup device 102 is previously measured for each of all numbers of characteristics. Then, relationships between the output voltage signal e obtained at the input brightness I and the output voltage signal e predicted to be obtained when it is assumed that the input-output characteristic is linear over the range of all input brightness of incident light is stored in LUT. When performing the gradation conversion processing, the conversion is performed with reference to LUT based on the number of the current input-output characteristic and the value of the output voltage signal e obtained at the time.

In the created LUT, for example, the numbers of the input-output characteristics of the image pickup device 102, the output voltage value obtained by the input-output characteristic 600, and a conversion factor of the output voltage value (corresponding to a value of the above-mentioned $e_2/e_1$) are stored. The number of the characteristics of the image pickup device is, for example, 10 in a case of FIG. 3. Therefore, a necessary bit number is, 4 bits for expressing the number of the characteristics, and 8 bits for the output signal RAW0 of the image pickup device 102, and then a necessary bit number for the LUT is 17 bits ($>\log_2 10^5$) when taking account of the fact that the dynamic range of the input brightness is about 100 dB ($1:10^5$) at maximum.

The method for linearization is not limited to the above method and any other method may be used. More specifically, there may be a method for performing conversion by predicting a position of a knee point which is a folding point in the input-output characteristic of the image pickup device to perform section linear conversion, or a method where an equation is approximated to a logarithmic characteristic and conversion is performed by using the equation. According to any method, inputs and outputs become in a complete linear relation for color signal processing.

The linearized output signal RAW1 (17 bits) obtained through linearization by gradation conversion is separated into three signals respectively corresponding to R, G, and B in the color signal generator 105. Blank pixels generated due to the separation are linearly interpolated by using values of adjacent pixels (step S708 in FIG. 7).

Details of the linear interpolation will be explained with an example. In the color filters shown in FIG. 5, for example, a color filter transmitting only blue light (B) is arranged on a pixel indicated by $B_{22}$. Therefore, from the pixel indicated by $B_{22}$, only the output voltage signal e corresponding to blue is obtained.

Accordingly, a signal $R_{22}$ corresponding to red light (R) and a signal $G_{22}$ corresponding to green light (G) predicted to be output from the pixel indicated by $B_{22}$ are required to be predicted and interpolated.

The signal $R_{22}$ corresponding to red light (R) and the signal $G_{22}$ corresponding to green light (G) can be linearly interpolated based on signals output from adjacent pixels to the pixel indicated by $B_{22}$ though the equations (1) and (2).

$$R_{22}=(R_{11}+R_{13}+R_{31}+R_{33})/4 \quad (1)$$

$$G_{22}=(G_{12}+G_{21}+G_{23}+G_{32})/4 \quad (2)$$

When performing the linear interpolation, in addition to simply performing the interpolation of the blank pixels, digital filtering for selecting frequency by using a low pass filter, a band pass filter, or the like, may be performed to weight the image. The digital filtering is performed by convolution operation having a predetermined Kernel coefficient. The result of the convolution operation may be a negative number depending on the set Kernel coefficient and therefore one bit for signs as a sign bit is added to the linearized output signal RAW1 (17 bits).

As described above, three linear color signals ($R_0$, $G_0$, $B_0$ (signed 18 bits)) expressing three colors R, G, and B for each pixel, for example each of all the pixels of the image pickup device, are generated.

Next, in the color signal correction part 106, color correction processing by linear operation is performed on the linear color signals $R_0$, $G_0$, $B_0$ as necessary (step S710 in FIG. 7). The color correction processing is performed to adjust saturation, hue, and the like so as to coincide $R_0$, $G_0$, $B_0$ with human's color vision characteristic.

As the color correction processing, specifically, white balance correction, linear matrix correction, and the like may be used. Details of the correction processing are omitted since it is not largely different from processings performed in an imaging apparatus using an image pickup device having general linear characteristic (for example, the processings disclosed in Japanese patent application publication No. 2001-86402).

By the color correction processing, the three linear color signals $R_0$, $G_0$, $B_0$ are converted into the three corrected linear color signals $R_1$, $G_1$, $B_1$ (signed 18 bits).

The other one output signal RAW0 of the two separated output signals RAW0 in step S704 is converted into the brightness signal $Y_1$ (8 bits) in the brightness signal generator 107 (step S712 in FIG. 7).

The processing is performed on the assumption that the image pickup device 102 has the original input-output characteristic 600 shown in FIG. 6. Similar processing to the linear interpolation processing performed in the color signal generator 105 is performed except that the color separation is not performed. The brightness signal $Y_1$ generated as described above has non-linear characteristic and is a signal having the broad dynamic range in relation to the input brightness I.

When the brightness signal $Y_1$ is generated in the brightness signal generator 107, at the same time, digital filtering for frequency selection by using a digital filter such as a low pass filter, a band pass filter, or the like may be performed.

Next, in the brightness signal correction part 108, contrast adjustment such as gamma correction, histogram correction, or the like to the brightness signal $Y_1$ is performed as necessary to generate the corrected brightness signal $Y_2$ (8 bits) (step S714 in FIG. 7).

The linear corrected color signals $R_1$, $G_1$, and $B_1$ and the corrected brightness signal $Y_2$ are combined in the color brightness composite part 109 to generate image signals $B_2$, $G_2$, and $B_2$ (step S716 in FIG. 7).

Hereinafter, details of the processing performed in the color brightness composite part 109 will be explained.

Figure 8:
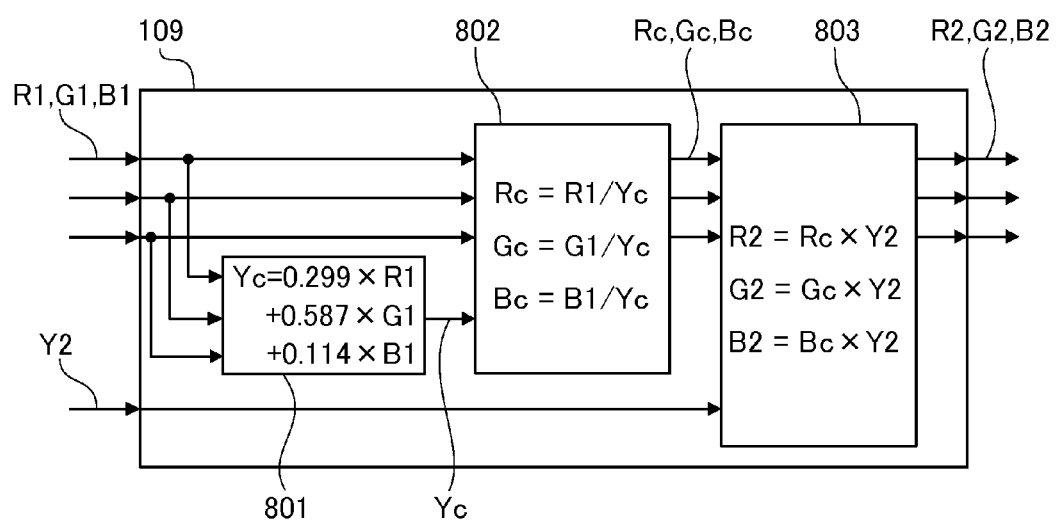
FIG. 8 is a view explaining composition processing performed in a color brightness composition part in Embodiment 1 of the present invention.

FIG. 8 shows a schema of the processing performed in the color brightness composite part 109. First, each of the corrected linear color signals $R_1$, $G_1$, $B_1$ is separated into two. Then in the processing block 801, a value of a brightness component $Y_c$ is obtained from ones of the two separated corrected linear color signals $R_1$, $G_1$, $B_1$ by using the equation (3).

$$Y_c = 0.299 \times R_1 + 0.587 \times G_1 + 0.114 \times B_1 \quad (3)$$

Since the input corrected linear color signals $R_1$, $G_1$, $B_1$ (signed 18 bits) have wide range values, this operation is performed as a floating point operation by converting the corrected linear color signals $R_1$, $G_1$, $B_1$ into floating point numbers.

Next, in the processing block 802, as shown in the equations (4) to (6), the corrected linear color signals $R_1$, $G_1$, $B_1$ are respectively divided by the value of the brightness component $Y_c$ obtained by the equation (3) to normalize the corrected linear color signals $R_1$, $G_1$, $B_1$. Thereby, normalized color signals $R_c$, $G_c$, $B_c$ are generated.

$$R_c = R_1/Y_c \quad (4)$$

$$G_c = G_1/Y_c \quad (5)$$

$$B_c = B_1/Y_c \quad (6)$$

This operation is also performed as a floating point operation.

In the processing block 803, as shown in the equations (7) to (9), the normalized color signals $R_c$, $G_c$, $B_c$ are respectively multiplied by the corrected brightness signal $Y_2$ generated in the brightness signal correction part 108 to generate image signals $R_2$, $G_2$, $B_2$.

$$R_2 = R_c \times Y_2 \quad (7)$$

$$G_2 = G_c \times Y_2 \quad (8)$$

$$B_2 = B_c \times Y_2 \quad (9)$$

This operation is also performed as a floating point operation and the operation result is output as integers of 8 bits.

The normalized color signals $R_c$, $G_c$, $B_c$ are signals having liner characteristics, and the corrected brightness signal $Y_2$ is a signal having non-linear characteristic, and therefore the combined image signals $R_2$, $G_2$, $B_2$ are signals having non-linear characteristics.

The corrected linear color signals $R_1$, $G_1$, $B_1$, the corrected brightness signal $Y_2$, and the image signals $R_2$, $G_2$, $B_2$ have the relationship expressed by the equation (10). It is assumed that an effect of an error due to reduced width in bits during operation is sufficiently small.

$$Y_2 = 0.299 \times R_2 + 0.587 \times G_2 + 0.114 \times B_2 \quad (10)$$

$$R_1 : G_1 : B_1 = R_2 : G_2 : B_2 \quad (11)$$

The equation (10) shows that the image signals $R_2$, $G_2$, $B_2$ and the corrected brightness signal $Y_2$ have the relationship between a three-primary color vector and a brightness vector formed therefrom and that the image signals $R_2$, $G_2$, $B_2$ have brightness information of broad dynamic range of the corrected brightness signal $Y_2$.

The equation (11) shows that a composition ratio (hue) of the image signals $R_2$, $G_2$, $B_2$ and that of the corrected linear color signals $R_1$, $G_1$, $B_1$ are equal to each other.

It is found from the equations (10) and (11) that signal intensity (saturation) in relation to the brightness signal is identical. That is, it is shown that, when the linear characteristic is converted into the non-linear characteristic, color reproducibility of the linear color signals $R_0$, $G_0$, $B_0$ are maintained.

The image signals $R_2$, $G_2$, $B_2$ generated as described above are displayed on the image output part 110 (step S718 in FIG. 7).

As described above, according to the imaging apparatus 10 of an embodiment of the present invention, a first output signal $S_1$ output from an image pickup device 102 which has a plurality of pixels having input-output characteristic which non-linearly changes according to input brightness of incident light is converted in an output signal linear converter 104 into a second output signal $S_2$ which is predicted to be output from the image pickup device 102 on the assumption that the image pickup device 102 outputs the second output signal S2 which linearly changes all over a range of input brightness of the incident light. Based on the obtained second output signal $S_2$, in a color signal generator 105, linear color signals $R_0$, $G_0$, $B_0$ (or corrected linear color signals $R_1$, $G_1$, $B_1$ which are obtained by correcting the linear color signals $R_0$, $G_0$, $B_0$) having linearity in each of a plurality of colors for each of all pixels of the image pickup device 102 are generated. In a brightness signal generator 107, a brightness signal $Y_1$ (or corrected brightness signal $Y_2$ which is obtained by correcting the brightness signal $Y_1$) having non-linear characteristic is generated based on the first output signal $S_1$ of the image pickup device 102. In a color brightness composition part 109, the linear color signal $R_0$, $G_0$, $B_0$ (or the corrected linear color signals $R_1$, $G_1$, $B_1$) and the brightness signal $Y_1$ (or the corrected brightness signal $Y_2$) are combined to generate image signals $R_2$, $G_2$, $B_2$. Accordingly, even when a subject having high contrast is imaged, halation or blacking-out is prevented because of the non-linear characteristic of the brightness signal $Y_1$ (or the corrected brightness signal $Y_2$) and an appropriate color image with high color reproducibility can be generated.

According to the imaging apparatus of an embodiment of the present invention, the color brightness composition part 109 performs normalization of the linear color signals $R_0$, $G_0$, $B_0$ generated in the color signal generator 105 (or the corrected linear color signals $R_1$, $G_1$, $B_1$) with a brightness component $Y_c$ which is a value obtained by adding, at a predetermined ratio, each of the linear color signals $R_0$, $G_0$, $B_0$ (or each of the corrected linear color signals $R_1$, $G_1$, $B_1$) to generate normalized color signal $R_c$, $G_c$, $B_c$. Image signals $R_2$, $G_2$, $B_2$ are generated by multiplying the normalized color signals $R_c$, $G_c$, $B_c$ by the brightness signal $Y_1$ (or the corrected brightness signal $Y_2$) and therefore the image signals can be generated by combining the color signals and the brightness signal with a simple operation.

According to the imaging apparatus of an embodiment of the present invention, the color signal generator 105 performs linear interpolation of the second output signal $S_2$ predicted to be output from the plurality of adjacent pixels on the image pickup device 102 to generate color signals in a plurality of colors for all of the pixels. Accordingly, loss of color signals can be interpolated with a simple operation.

The imaging apparatus 10 may be used for monitoring such as a back monitor for a passenger in a vehicle to visibly confirm a situation of a vehicle periphery. In this case, the image output part 110 may be a display part provided with a display monitor. Thereby, the image where the brightness information having the broad dynamic range and the color information with color reproducibility same as the image pickup device with linear characteristic are maintained can be displayed.

The imaging apparatus 10 may be used in an image processing system such as an obstacle detection apparatus to detect an obstacle around the vehicle, or a lane marker detection apparatus to detect a deviation from a lane by detecting a position of a lane marker showing driving lanes. In this case, the image output part 110 is an image recognition part having a microcomputer for an image recognition. Then, image processing for detecting various objects based on an imaged image is performed. In order to perform the right detection, it is important to prevent occurrence of halation or blacking-out in an area of the objects to be detected and to coincide color of the objects to be detected with human's color vision characteristic. Accordingly, the present invention would be sufficiently effective.

While, in the above described embodiment, the primary color filters are used, complementary color filters may be used. Similarly, a color filter having a plurality of colors which expresses a relationship between brightness and color based on human's vision characteristic through at least one equation may be used.

In the above embodiment, output signals RAW0 which are completely identical image data are separated for color signals and a brightness signal which are then combined. However, the color signals and the brightness signal are not necessarily generated from the completely identical image data. For example, the input-output characteristic may be continuously switched between color signals and a brightness signal in the image pickup device. Then, two images are imaged and combined. Two image pickup devices having substantially same imaging ranges may be used to obtain two images having different input-output characteristics for color signals and a brightness signal, respectively.

According to the imaging apparatus of an embodiment of the present invention, an appropriate color image can be generated even when imaging a subject with high dynamic range.

Although the preferred embodiments of the present invention have been described, the present invention is not limited thereto. Various changes and modifications can be made to the embodiments by those skilled in the art as long as such modifications and changes are within the scope of the present invention as defined by the claims.

What is claimed is:

1. An imaging apparatus comprising:
an image pickup device configured to output a first output signal having linear and non-linear characteristics and including a brightness signal and a color signal corresponding to an imaged image, the image pickup device having
a plurality of pixels having input-output characteristic which non-linearly changes according to input brightness of incident light and
a plurality of color filters in a plurality of colors, the plurality of color filters being arranged on respective pixels in a predetermined pattern;
a signal separator that separates the first output signal output from the image pickup device into two output signals;
an output signal linear convertor configured to convert one of the two output signals separated in the signal separator into a second linearized output signal having the linear characteristic by linearization processing;
a color signal generator configured to generate three linear color signals representing colors of R, G, and B, respectively, on each of the pixels based on the second linearized output signal converted by the output signal linear convertor;
a brightness signal generator configured to generate a non-linear brightness signal from the other one of the two output signals separated in the signal separator; and
a color brightness combiner configured to normalize the linear color signals generated by the color signal generator to generate normalized color signals and combine the normalized color signals and the non-linear brightness signal generated by the brightness signal generator to generate an image signal.

2. The imaging apparatus according to claim 1, wherein the color brightness combiner generates the image signal by multiplying the normalized color signals by the non-linear brightness signal generated by the brightness signal generator.

3. The imaging apparatus according to claim 1, wherein the color signal generator linearly interpolates the second linearized output signal predicted to be output based on a plurality of adjacent pixels to generate the color signals in the colors of R, G and B on each of the pixels.

4. The imaging apparatus according to claim 1, wherein the signal separator is configured to separate the first output signal generated in the image pickup device into two identical output signals.

* * * * *